United States Patent [19]

Chater et al.

[11] Patent Number: 5,598,351
[45] Date of Patent: Jan. 28, 1997

[54] COMMUNICATION SYSTEM

[75] Inventors: John C. Chater; Ian Chater; Guy Chater, all of 4/6 The Paragon, Blackheath Village, London, England, SE3 0NY; Martin D. Keywood; Ian W. Henley, both of London, England

[73] Assignees: John C. Chater; Ian Chater; Guy Chater, all of London, England

[21] Appl. No.: 325,421

[22] PCT Filed: Feb. 26, 1993

[86] PCT No.: PCT/GB94/00377

§ 371 Date: Jan. 27, 1995

§ 102(e) Date: Jan. 27, 1995

[87] PCT Pub. No.: WO94/19907

PCT Pub. Date: Sep. 2, 1994

[30] Foreign Application Priority Data

Feb. 26, 1993 [GB] United Kingdom ............... 9303998

[51] Int. Cl.$^6$ .................................................. H04N 1/327
[52] U.S. Cl. ........................................ 364/514 A; 348/15
[58] Field of Search ........................... 364/514 A; 348/3, 348/5, 13, 14, 18, 7, 12, 15, 19; 395/200, 114, 154, 155, 909, 200

[56] References Cited

U.S. PATENT DOCUMENTS 4,734,764 3/1988 Pocock et al. ...................... 358/86
5,245,553 9/1993 Tanenbaum ...................... 364/514 C
5,313,408 5/1994 Goto ................................. 364/514 C
5,375,068 12/1994 Palmer et al. .................... 364/514 C

OTHER PUBLICATIONS

Technische Mitteilungen PTT, vol. 69, No. 3, 1991, pp. 95–109; U. Haller: "BASCOM—Ein Pilotnetz der PTT fur Breitbandkommunikation" and English Translation.
IEEE Transaction on Communications, vol. com-31, No. 2, Feb. 1983, pp. 245–250; R Gordon: "An Interactive Information Terminal".

*Primary Examiner*—Emanuel T. Voeltz
*Assistant Examiner*—Thomas Peeso
*Attorney, Agent, or Firm*—Hodgson, Russ, Andrews, Woods & Goodyear LLP

[57] ABSTRACT

A communication system for facilitating introductions comprising a plurality of terminals, recording means for recording a visual image of an individual at said terminal and for storing said image in a store together with corresponding images from other said terminals, networking means for networking images from said store amongst terminals from which the images do not originate, selecting means enabling said individual to select an image from amongst those transmitted to his/her terminal, indicating means to indicate such selection to the terminal from which the selected image originated, and communication means controlled by the individual at the selected terminal enabling the individuals at the selecting and selected terminals to communicate with each other.

38 Claims, 9 Drawing Sheets

COMMUNICATION SYSTEM

This invention relates to a communication system for facilitating introductions its primary purpose is for effecting social introductions between members of the opposite sex (dating) but it may also find applications for other purposes, for example at employment exchanges or job centers, particularly in circumstances where an employer intends to recruit a substantial number of staff and wishes to make a preliminary selection on a sounder basis than is possible from only written particulars of the candidates.

Video dating agencies are known in which a person seeking introductions subscribes to an agency and makes a short video of him/herself, which is then made available by the agency to other subscribers who have expressed an interest in the individual. Those who wish to be introduced then contact the agency, who puts the two parties in contact.

This known service has the disadvantage that it is an off-line procedure, so there is often a considerable delay between an individual registering with the agency and making a video, and receiving a response. The present invention has as an object the provision of a system in which the lead-time between registering and receiving a response from another individual is substantially reduced.

According to the invention, there is provided an introduction system comprising a plurality of terminals, recording means for recording a visual image of an individual at said terminal and for storing said image in a store together with corresponding images from other said terminals, networking means for networking images from said store amongst terminals from which the images do not originate, selecting means enabling said individual to select an image from amongst those transmitted to his/her terminal, indicating means to indicate such selection to the terminal from which the selected image originated, and communication means controlled by the individual at the selected terminal enabling the individuals at the selecting and selected terminals to communicate with each other.

The visual image may be accompanied by data regarding the individual.

The terminal may comprise means for the individual to record a video recording of him/herself at said terminal, and to transmit said recording to the store.

The visual image is a still image in the preferred embodiment, and may for example be a video freeze-frame or other still extracted from the video recording. For example, it may be selected directly from a camera image projected on the terminal screen.

Each terminal may comprise means for displaying simultaneously a plurality of the visual images transmitted thereto.

There may be means enabling the individual at the selected terminal to review the video recording of the individual (which recording may be stored on videotape or in digital or other format) at the selecting terminal before activating the communication means.

Preferably there are means for an individual at a selecting terminal to review a video recording of a person at a selected terminal before operating the indicating means.

The indicating means may be adapted to cause transmission of the visual image of the individual at the selecting terminal to the selected terminal together with an indication of interest.

The networking means may be adapted to network the visual image from a said terminal to other terminals in a defined geographical area.

Each terminal may comprise means to activate the terminal and connect it to the networking means for a limited period of time upon payment of a time-related fee.

The system may comprise means controlling the store whereby the visual image from the activated terminal is stored during use of the terminal by said individual and thereafter is erased or transferred to a secondary storage means.

There may be a single store in which all said images of individuals at terminals are stored.

Alternatively, there may be a plurality of stores, each store communicating with at least one other store to exchange images of individuals at terminals.

In a preferred embodiment each said image is initially stored at predetermined respective one of said stores.

The networking means may utilise a public ISDN, a cable network or other means of data networking.

The networking means may be controlled by the said selected terminal to permit direct communication via the ISDN between the selected and selecting terminal.

The system may comprise a plurality of geographically or otherwise physically separate stations each comprising a plurality of terminals, each terminal being screened and acoustically insulated from neighbouring terminals.

The invention also provides a terminal for use in a system as set forth above comprising means for recording a visual image of an individual using said terminal; means for transmitting said visual image to a store, means for receiving from said store a plurality of visual images originating from other terminals; means for selecting one of said received images; means for indicating said selection to a terminal which has transmitted the selected image; and means for controlling communication with another terminal following receipt from said other terminal an indication that the user thereof has viewed said recorded visual image and wishes to establish communication.

The invention will now be described merely by way of example with reference to the accompanying drawings, wherein:

FIG. 1 is a block diagram of a system according to the invention;

FIGS. 2 to 7 identify the components of the system of FIG. 1 which are utilised in successive operating modes;

Figure 1:
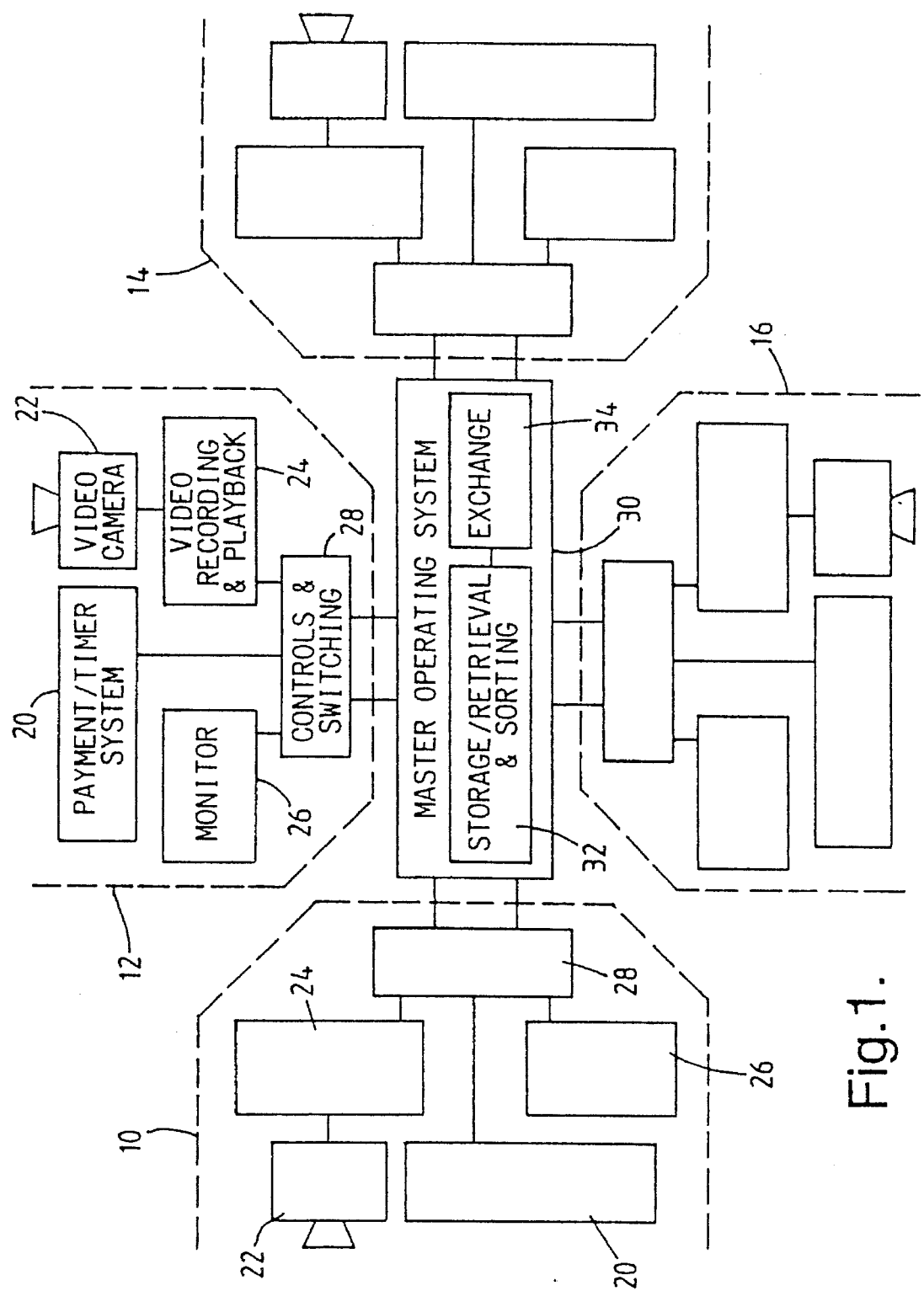

Referring to FIG. 1, the system comprises a plurality of terminal stations 10,12,14,16 which are geographically spaced apart, say in neighbouring towns, or in different districts of a city. In a fully developed system there would be a network of such terminal stations throughout the country.

Each terminal station is intended for use by members of one sex at any one time. In each locality served by the system there are separate terminal stations for men and women, either in different buildings or perhaps in separate parts of the same building. To cater for variations in demand, each station, or discrete parts of each station may "change sex" by being re-designated at the controller 30 described hereafter.

Each terminal station comprises a number of terminals each in a separate booth screened and sound-proofed from neighbouring terminal booths. For convenience, only one such terminal is shown at each station 10,12,14,16.

Each terminal booth contains a bench, facing mirror, a timer 20 activated by a token or coin-freed apparatus or credit/charge card reader, a video camera and microphone 22, recording and playback equipment 24, a VDU monitor (CRT or LCD) 26, a loudspeaker or headphones and simple push-button controls and associated switching 28 as hereinafter described.

The terminals are connected to a networking controller 30 by conventional communication links suitable for video signal transmission, for example either through the telephone system, microwave links, or dedicated fibre-optic or other hard-wired circuits. The video signal may be digitised and compressed for transmission.

The controller 30 contains a store 32 for the storage and retrieval of still frame pictures as described hereafter, and exchange switching 34 for transmitting selections of the still pictures to opposite-sex terminals, the selections being made for example on the basis of the geographical locations of the originating and receiving terminals.

Figure 2:
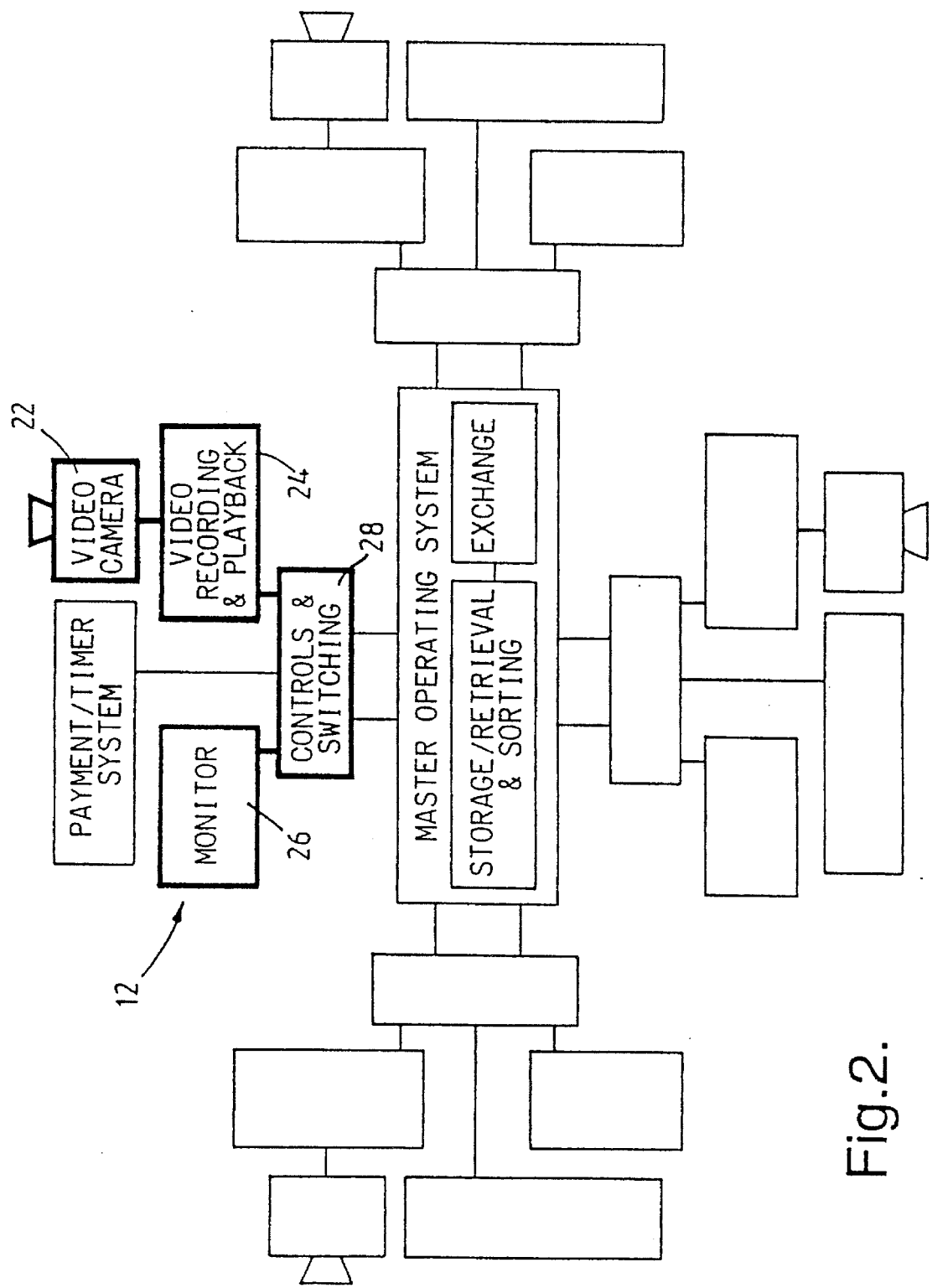

A person making use of the system enters the booth in (say) station 12 (FIG. 2) and accesses the terminal by inserting a token or card. Upon pressing a start button, instructions are displayed on the monitor Press RECORD Give your:

First name

Age and sex

Occupation

District in which you live

The user's sex is requested because although it can be deduced from the terminal location in a segregated-sex station, this is not so for a single terminal as described hereafter.

The person then arranges him/herself in the minor, perhaps rehearses first, and then records a short (e.g. twenty-second) video. The components 22,24,26,28 of the system utilised at this stage are shown in bold in FIG. 2. The video camera 22 is pre-focused to film a head-and-shoulders shot of the booth occupant and to provide an instant display thereof on the monitor whilst recording sound and picture in the equipment 24 for future playback.

Upon completion of recording the recording equipment 24 rewinds enabling the booth occupant to review his/her performance.

If not happy with the results he/she can re-record over the previous attempt until a satisfactory result is obtained. The occupant then selects a single still frame from the video which he/she considers the best for storage in the central store 32.

Figure 3:
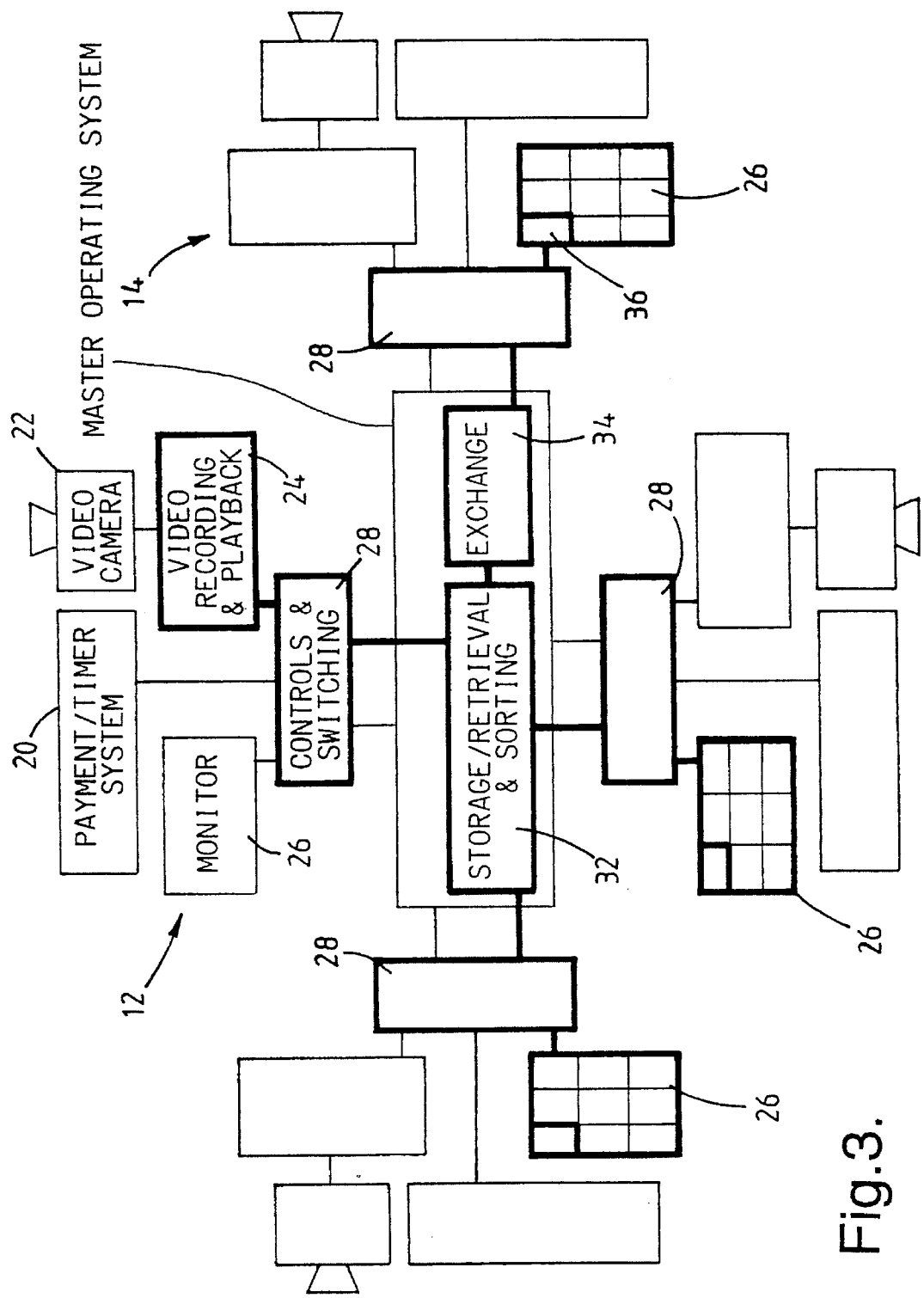

Referring now to FIG. 3, the booth occupant presses a "transmit" button and his/her video recording and selected still frame are sent to the central store 32 and retained therein until the payment/timer system 20 switches off. The central store 32 sorts the still frames in its memory according to original terminal station and transmits each frame to opposite-sex booths at neighbouring stations. Alternatively or in addition the booth occupant may specify stations to which he/she does or does not wish the frame to be sent.

If the store has sufficient installed capacity the system can also allow the video to be sent to the store and retained there, enabling faster access and review by opposite-sex terminals.

The still frames received at a terminal are displayed on the monitor 26 in a composite array or bitmap showing in this example nine frames each with an identifying reference number, the one originating from the terminal at station 12 above being indicated at 36 in the monitor 20 of station 14.

Figure 4:
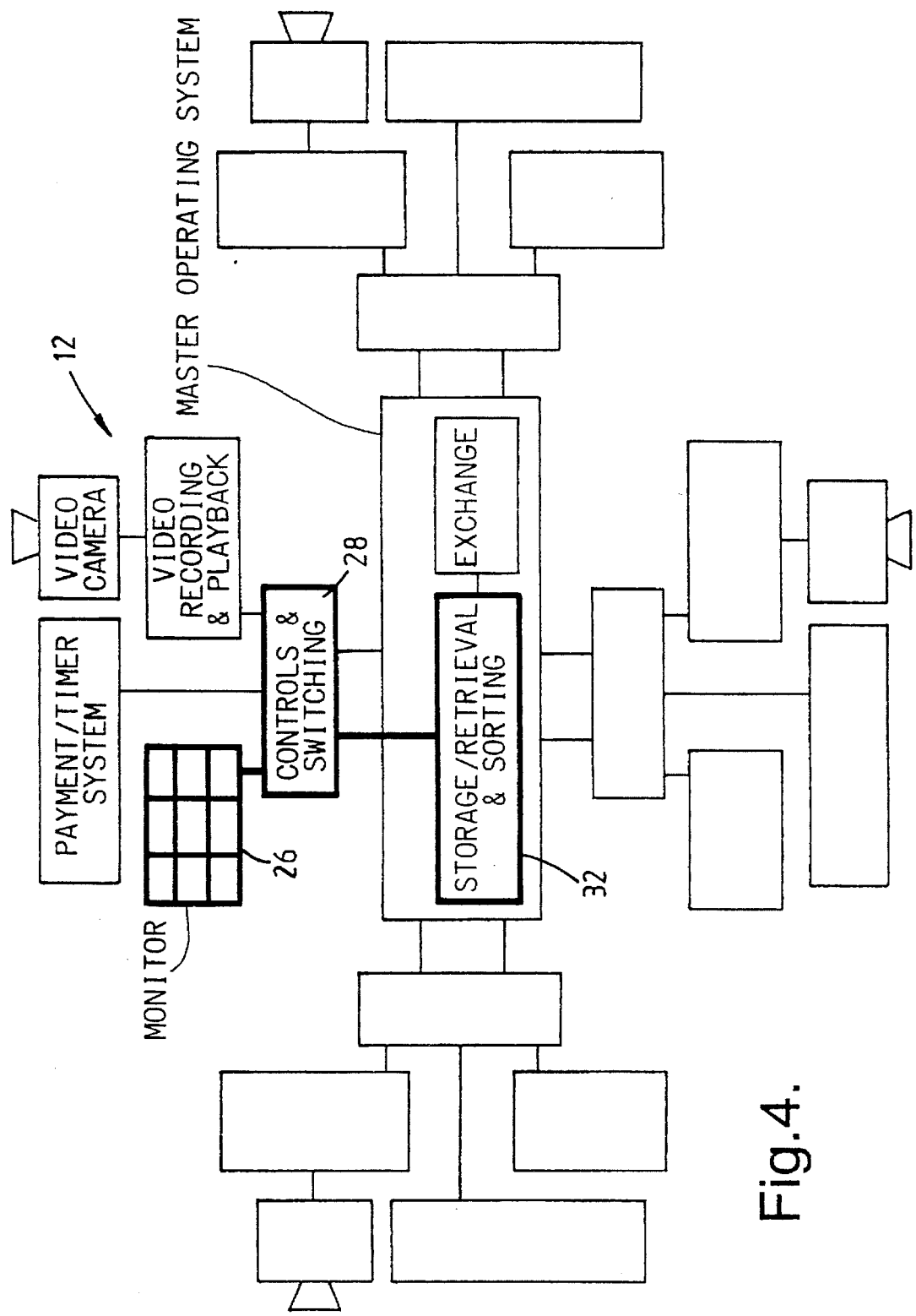

The booth occupant at station 12 likewise receives a bitmap of nine still frames on his/her monitor, as indicated in FIG. 4. If none appeal, then further selections may be accessed by pressing a "more" button.

Figure 5:
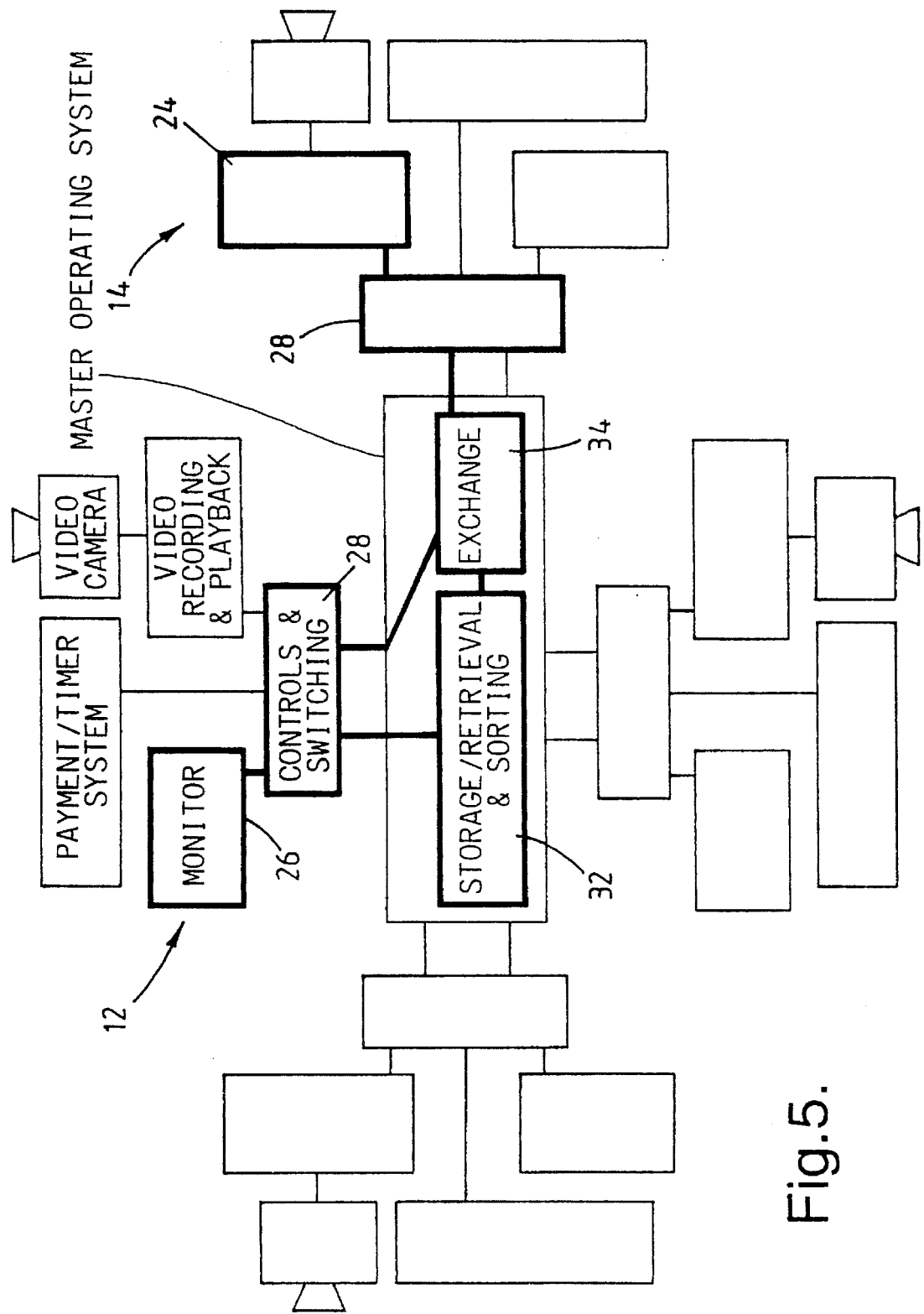

If the booth occupant at station 12 finds one of the still frames of interest, say that of the occupant at the illustrated booth at station 14, he/she selects that frame by keying the appropriate number and presses a "play" button which initiates replay of the video recording from which the selected still frame was taken, as shown in FIG. 5. If having seen and heard the video recording the booth occupant at station 12 is no longer interested he/she can revert to further arrays of nine stills until an acceptable one is found.

Figure 6:
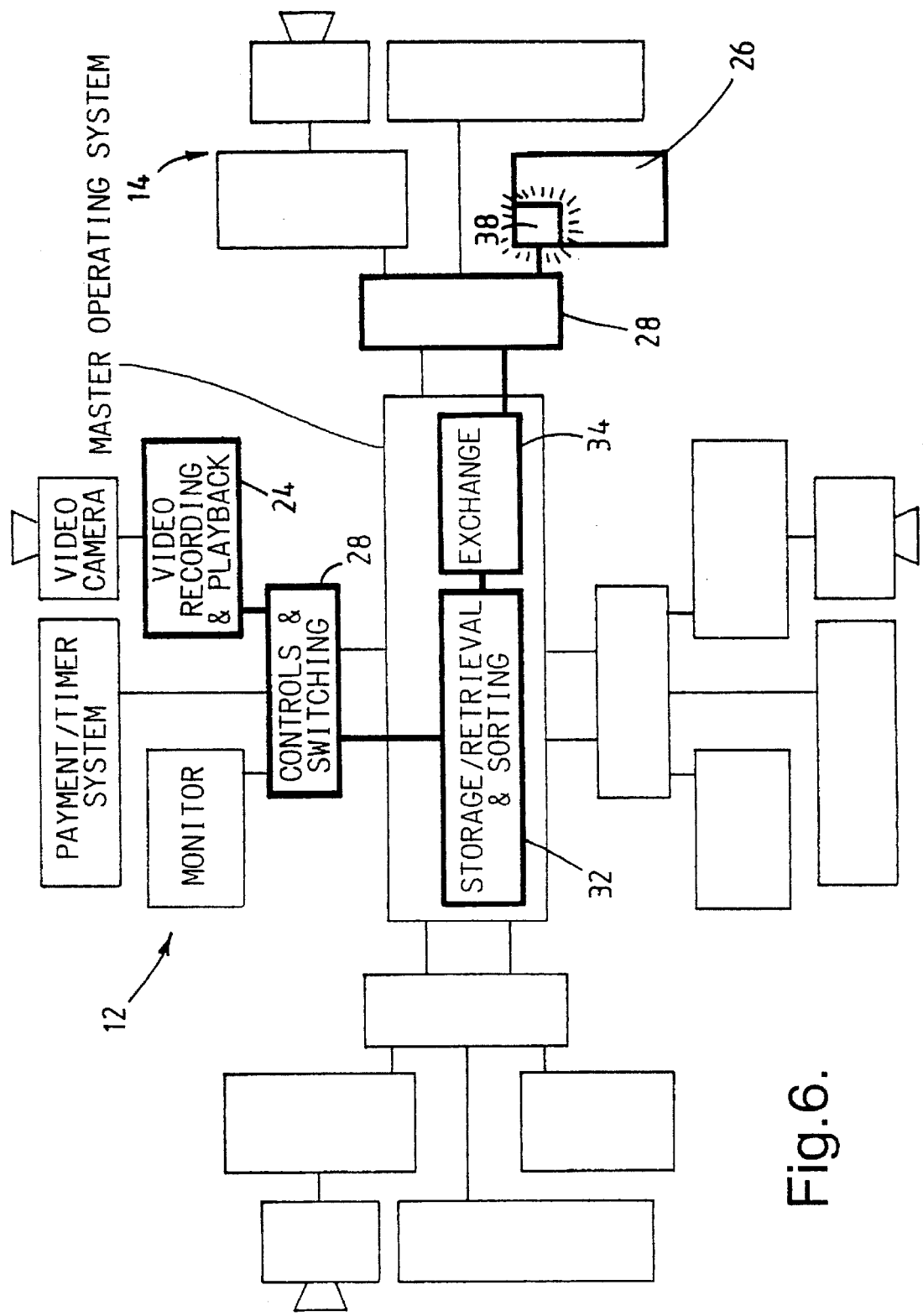

Alternatively, if the booth 12 occupant finds the person in the video recording interesting, he/she indicates interest by pressing a "this is me" button which causes his/her video still to be displayed at that person's terminal, e.g. at station 14 as shown in FIG. 6, with a message or emphasis showing the sender's interest.

The video still is presented as a window 38, so as not to interrupt excessively the use of the screen by the person at station 14. Alternatively a marker may be shown on the screen inviting him/her to view the video still when convenient.

Figure 7:
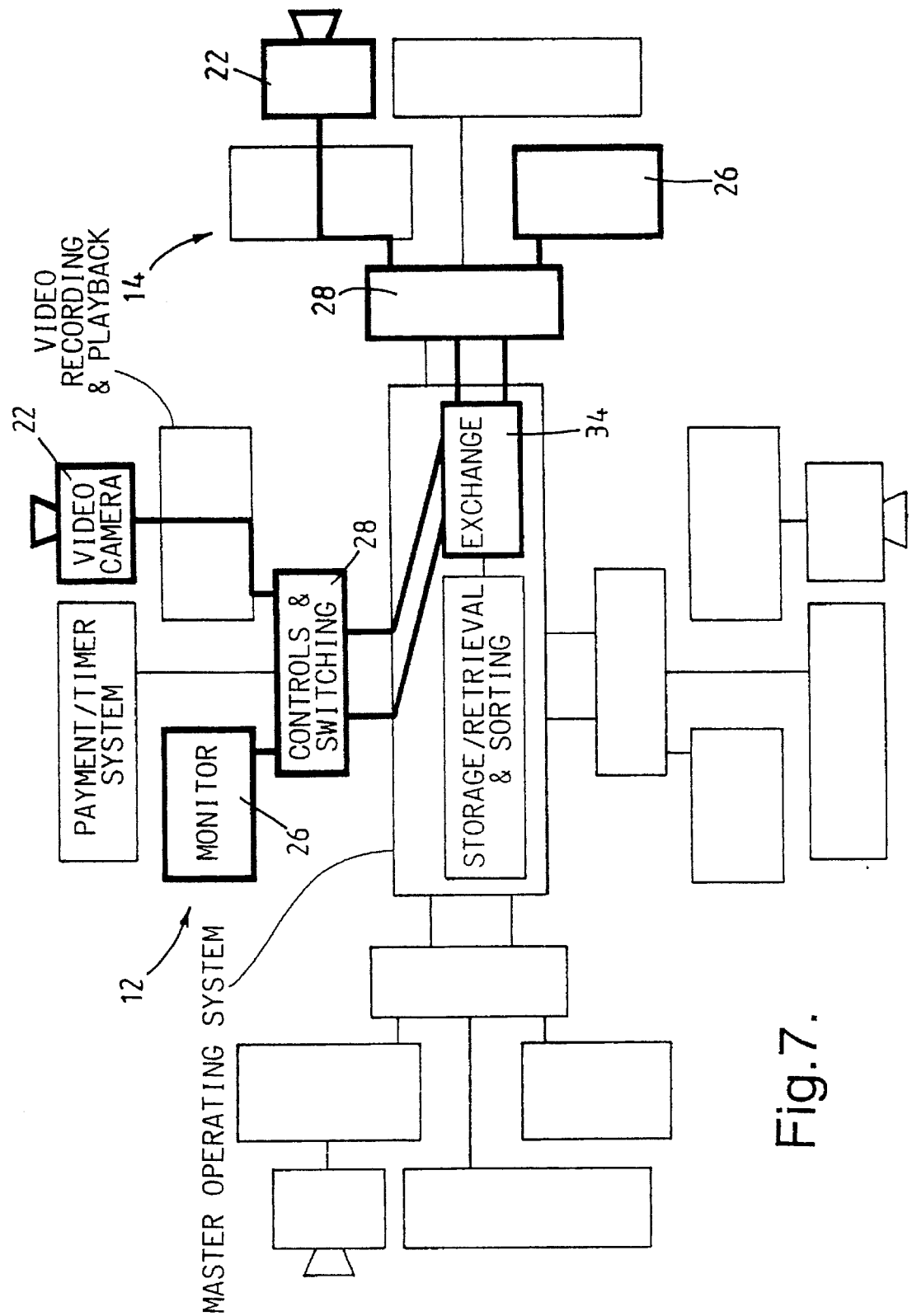

The person at station 14 can respond either by pressing a "busy" button if he/she is already talking to someone, or is just not interested, or by calling-up the booth 12 occupant's video recording. If interest is confirmed on seeing the recording, the booth 14 occupant presses a "talk" button, thereby establishing audio-visual contact with the person at booth 12, as shown in FIG. 7. The parties are then free to converse as they wish until the time purchased through the timers 20 at either of the stations expires, or one party breaks the communication link by pressing the "MORE" button, which causes both the terminals to revert to the nine-image selection mode discussed with reference to FIG. 4.

Figure 8:
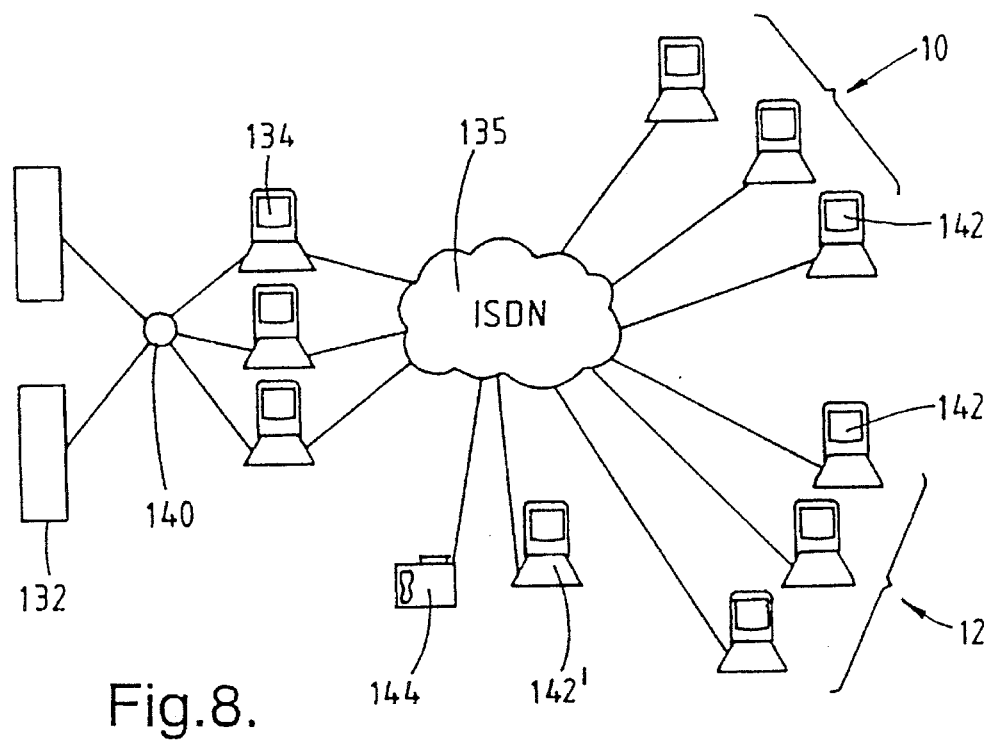
FIG. 8 shows another embodiment of the invention.

FIG. 8 shows how the invention may be realised by the use of an ISDN (Integrated Services Digital Network) system.

The controller 30 of FIG. 1 is constituted by a number of call-controller PCs 134 which in combination with an ISDN 135 perform the function of the exchange switching 34. One or more central file servers 132 act as the store 32. The PCs and servers are linked by a LAN hub 140. The stations 10,12,14,26,etc., include terminal PCs 142 to function as the controls and switching 28, monitor 26 and video recording and playback facility 24 of FIG. 1 in combination with a video camera (not shown). High-quality recording, playback and communication are achieved by equipping the PCs 142 with MPEG record and playback cards, a British Telecommunications plc VC8000 video conferencing card for compressed audio visual and data transmission via the ISDN to the call controller PCs 134. MPEG is the Moving Pictures Expert Group's standard for digital compression of PAL video signals.

Connection between users via the public ISDN network provides sufficient data bandwidth to allow video conference calls to be made. The H320 series of standards that are applicable to this medium include a subset dealing with the compression of synchronised video and audio output. The terminal PCs 142 are fitted with video conferencing cards to permit this; the VC8000 card is preferred amongst currently available cards. This card performs three functions: video overlay on to PC screen, video and data screen compression and decompression, and communications handling across the ISDN.

The VC8000 requires a PAL input which can be either the camera for live communication, or the MPEG stream converted back to PAL for a recorded sequence. It is preferred to store the recorded sequences in H320 format so that multiple transformations are not required. Whilst this cannot be achieved with a VC8000 card, it may be possible using a Telsys product (newly available in 1994) which provides H320 storage to disc using a server architecture. This would also enable the MPEG cards to be dispensed with.

The terminal stations 10,12,14,16 may each comprise a number of PCs 142, or some or all could have just a single PC 142'; such single terminals stations could find applications in outlets such as bars, restaurants, shops, etc.

A terminal may alternatively be provided by means of a videophone 144. In such cases the video recording is made at the master station by means of one of the call controller PCs 134 and servers 132.

Revenue collection by the system operator from terminal operators may be made automatically by arranging for access to the system to be achieved by dialling a premium-rate number (e.g. 0898 numbers in the United Kingdom). Then a terminal is automatically billed by its' telephone service provider for time-on-line to the system. In such situations, or indeed generally if desired, the software for the terminals 142,142' may be downloaded from the controller PCs 134 via the ISDN or other public telephone network e.g. by dialling a toll-free number (0800 in the UK).

Site servers 132 receive all of the stills and recordings for new live users by calls via the ISDN from terminal PCs 142 to the controller PCs 134. The user software in the terminal PCs holds the ISDN numbers of the controller PCs.

The LAN hub 140 uses a very high bandwidth backplane and allows a large number of controller PCs to be provided, although limitations on the server hard disc access may require multiple servers to be provided to hold and present the user clips.

The servers 132 maintain and keep track of which users are viewing which composite bitmaps. As a new user joins or leaves the system the relevant composite bitmaps are updated centrally and then distributed by a short VC8000 data call to each of the receiving terminal PCs 142.

The MPEG record card at the terminal PC 142 is used to record the 20 second clip and to select the still image. When the still and recording are transferred to the server (where each 20 second recording requires 3.75 megabytes of disc space), the information transferred will include the ISDN number of the terminal 142 at which the new user is signing on to the system. This number is used to set up direct connections between the terminals of users who have agreed to speak to each other. However, a call re-direction facility is provided so that if a terminal operator, e.g. a single terminal does not wish his ISDN number to be made known the connection is made via the controller PC 134.

When a user requests to view a recording, the controller PC 134 finds the clip on one of the servers 132. The controller reads the MPEG sequence from the server and converts the stored sequence into PAL. The PAL output becomes the source for the VC8000 card which transmits the sequence to the user's terminal PC 142 as an H261 and G728 data stream.

When a session has been completed the user has the option of saving his/her still and recorded sequence for subsequent use, or by default it will be deleted.

Figure 9:
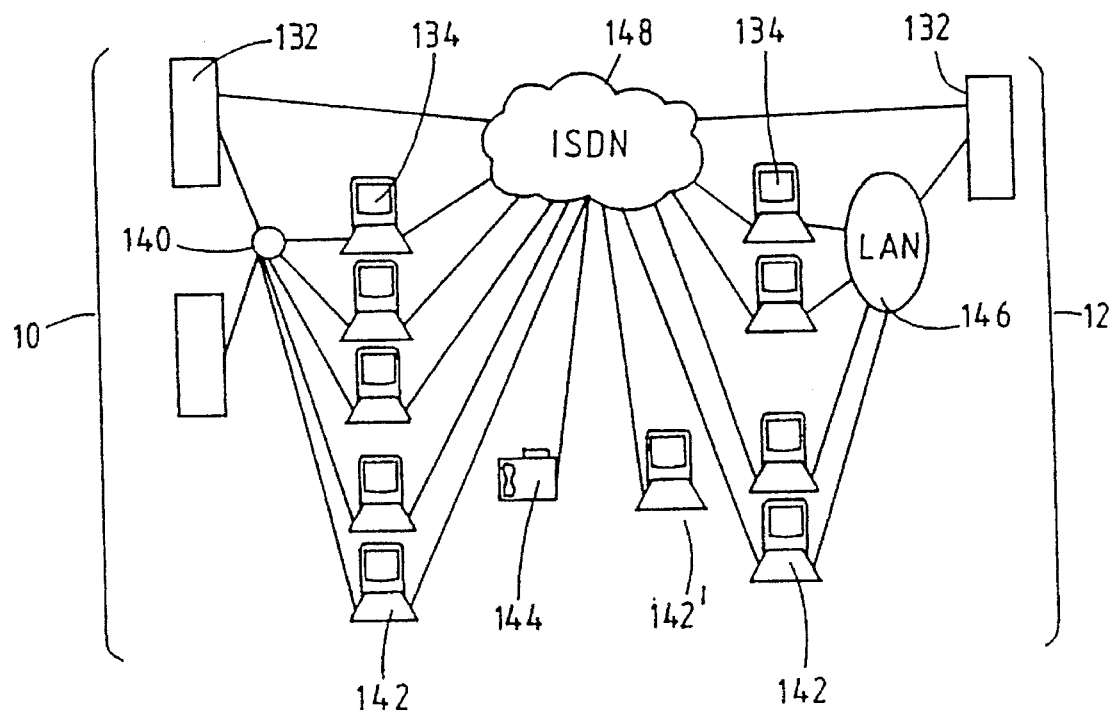
FIGS. 9 and 10 show a further embodiment.

FIG. 9 shows a further development of the system in which the storage of video recordings and the compilation of bitmaps is performed at or in the locality of the terminal station at which they originate. The terminal PCs 142 of terminal station 10 are connected via LAN hub 140 to local controller PCs 134 and local servers 132, both of which are at or close by the terminal station location. Terminals 142 for men and women for a given neighbourhood which are located close to each other, e.g. in separate parts of the same building, will share the same controller PCs and servers. Video recordings of users of the terminals 142 are stored in those servers. Terminal PCs 142 of terminal station 12 communicate via LAN 146 with controller PCs 134 and local server 132. The station 12 is shown as having fewer controller PCs and servers than station 10, to illustrate that different stations may have different installed capacities, depending on demand. Each LAN 146 can accommodate a server and five controller PCs 142. If more than five PCs 142 are to be serviced, then the LAN may be duplicated or resort may be had to the hub system shown for station 10. Single terminal stations 142',144 communicate with controller PCs 134 at one of the stations 10,12 via the ISDN 148.

Figure 10:
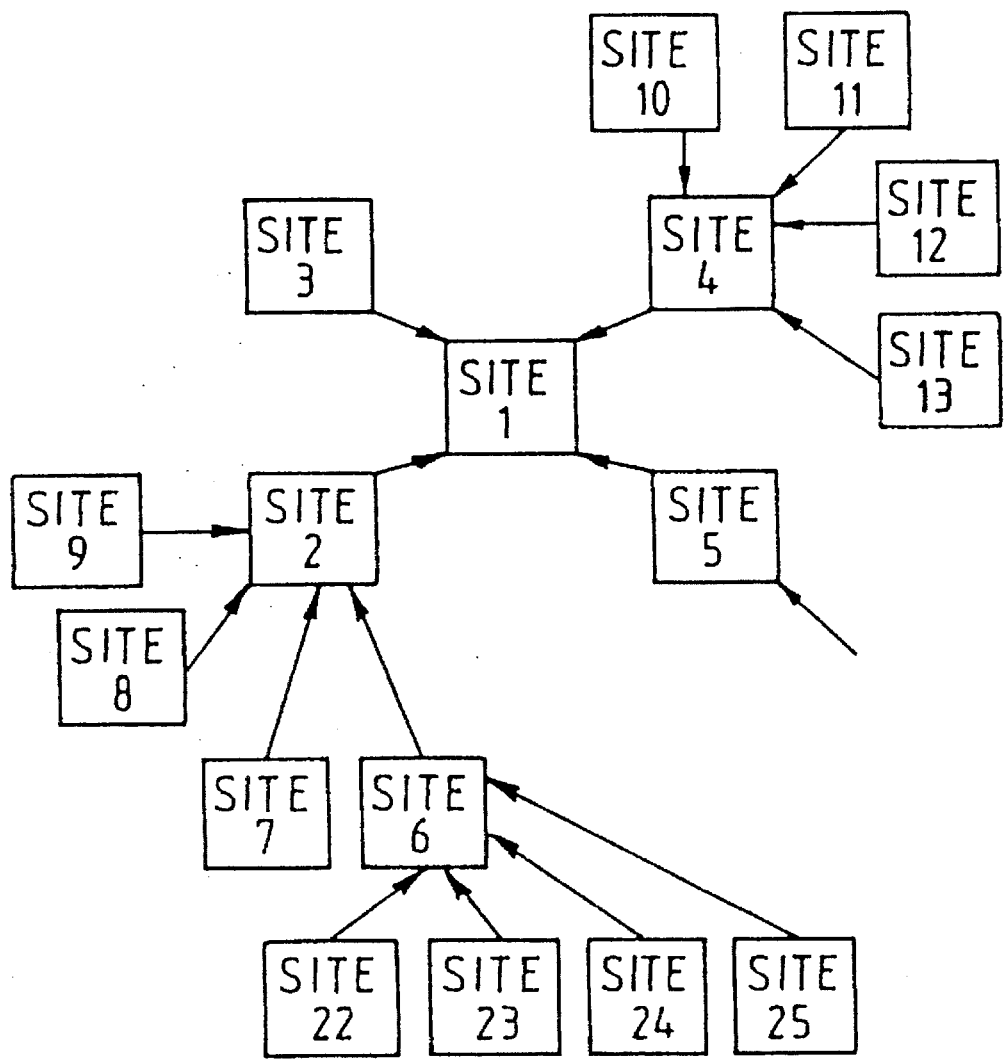

The servers 132 communicate with each other via the ISDN network and exchange bitmaps. Each server (or group of servers at a single location) in fact communicates with the servers at its four closest neighbouring terminal stations, as shown in FIG. 10.

In that figure "site 1" corresponds for example to terminal station 10 of FIG. 9, "site 2" to station 12, "site 3" to station 13, and "site 4" to station 14. Each individual server creates and maintains its own composite bitmaps of users from the closest four sites.

When a new user starts a session the initial set of bitmaps he views are those from the four geographically closest sites. Should the user make use of the "More" control then the system presents images of people from a progressively wider geographical area. The system detects when the user is nearing the end of a set of images and automatically prepares the next set to view to ensure smooth continuation of the selection process. These images are mixed so that people from each of the four sites that make up an area are viewed at the same time.

In order to maximise the initial choice, three areas are available for immediate access during the initial viewing period. These bitmaps are collated from these area sites while the user is making his own video clip and selecting his chosen still. Other areas are progressively made available on demand.

The user effectively "ripples" out the search from the four closest sites onwards. Referring to FIG. 10, the first set of bitmaps are those for Sites 2–5 following 6–9 and then 10–13 and so on. Once this level has been exhausted the user can move out to the bitmap that covers the Sites 22–25 and then the ones connected to Site 7. The system monitors the user and keeps a minimum number of bitmaps prepared for viewing at all times. Each site composes and maintains only the composite bitmap for its four closest sites, and periodically updates the other sites of changes in the bitmap composition.

The user has the ability to move backwards as well as forwards among the composite bitmaps already presented.

In order that the storage capability for the recordings is as flexible as possible, and to allow multiple users to view the same video clip simultaneously, storage is by means of PC hard disc. The format of storage is preferably to compress the camera and audio streams into MPEG formats as used by CD-I units.

The recordings are kept on the local server and played to remote users via the controller PCs 134. Using this approach it is possible to service up to five simultaneous requests to view a single recording from within one site or, alternatively, five requests to view different recordings from within one site, or any intermediate combination.

Providing that all of the controller PCs are not busy, the time from requesting to view to receiving the requested recording should be only a few seconds. During this time the system moves the bitmap of the selected user to centre focus on the screen at the requesting terminal 142, enlarges the image and provides a brief introductory sequence "counting down" to the arrival of the clip.

If a remote site is temporarily unable to play the requested clip because all its controller PCs 134 are busy, the user can choose to wait or continue and select an alternative. The system can if requested play the original choice when it becomes available.

The method of use of the systems shown in FIGS. 8, 9 and 10 is basically the following. Although this sequence is described in the context of a terminal at a dedicated multi-terminal station, it also applies to a single terminal.

1. The user purchases sufficient credits for a session from a machine or cashier and inserts either one of these or a credit card into the booth.
2. The user moves PC 142 out of wait state and receives a promotional and instructional video message.
3. New users must enter their name and sex. Regular users may obtain a system generated PIN (personal identification number).
4. The user is then offered the opportunity to record a video clip of a maximum length of 20 seconds by using simple record, stop, play and rewind commands. A record, review re-record cycle can occur at this point.
5. Once the sequence has been saved in the PC 142, the user is prompted to capture a still image which will be the one used by the system to show the user at other sites. Again there can be simple commands and a capture, review and capture cycle until the user is satisfied.
6. Regular users of the system may wish to save their introduction sequence which when the user signs-off can be transferred to a secondary store (e.g. another server, not shown in the figures). The user may subsequently access it by using his/her system generated PIN. The default case will be to erase the sequence following a declined option to store.
7. The still is then transferred to the server 132 and transmitted to all the other sites that are currently viewing bitmaps from the site.
8. The user is presented with bitmaps of the users from the nearest four sites. The bitmaps are presented such that users from all of the four sites are mixed on any one screen. A simple "More" command enables the user to view further sets of bitmaps. As the user continues to view bitmaps the geographical spread of the search will widen. The system automatically detects when sets of bitmaps have been completed and cue up further sets in advance.
9. The user selects a remote user whose clip he/she wishes to view by using the keyboard or mouse. The system informs the user that the request to view the clip has been received and the selected bitmap is enlarged and given centre focus.
10. The remote users clip is then viewed by the user who then has the choice of atiempting to present his/her own still or going back to the bitmap.
11. If the user wishes to present his still, the remote (selected) user is presented with a flashing image of the selecting ,user, who is informed that the image is flashing at the remote end.
12. The remote user can then view the selecting user's clip or decline to do so. The user is informed of the outcome of this decision.
13. The remote user also has the option to bypass the clip review and go straight to live communication. If live communication is selected the remote user immediately appears live on the user's monitor and vice versa.
14. If the recorded sequence is reviewed by the remote user, another option is given when it completes either to go live or to reject the invited contact. The selecting user is informed if the outcome of this decision is to reject. Whilst the clip is being viewed the original user is still able to view the bitmap selection screens.
15. When the user's session is running out, a warning is given leaving sufficient time to input more credits.
16. When the session is complete the system erases all details of the user unless a selection is made to save those details.

We claim:

1. A communication system for facilitating introductions comprising a plurality of terminals, each with a video camera directed to view an individual using said terminal, said recording means for recording a visual image of said individual, means for adding said image to a store containing corresponding images from other said terminals, networking means for networking images from said store amongst terminals from which the images do not originate, selecting means enabling said individual to select an image from amongst those transmitted to his/her terminal, indicating means to indicate such selection to the terminal from which the selected image originated, communication means controlled by the individual at the selected terminal enabling the individuals at the selecting and selected terminals to communicate with each other, and means enabling the individual at the selected terminal to review a video recording of the individual at the selecting terminal before activating the communication means.

2. A system as claimed in claim 1, wherein each terminal comprises means for displaying simultaneously a plurality of the visual images transmitted thereto.

3. A system as claimed in claim 1, comprising means for the individual at the selecting terminal to record said video recording of him/herself at said terminal, and to transmit said recording to the store.

4. A system as claimed in claims 3 or 7, wherein the visual image is still from the video recording.

5. A system as claimed in claim 1, comprising means for the individual at the selecting terminal to review a video recording of a person at a selected terminal before operating the indicating means.

6. A system as claimed in claim 1, wherein the indicting means is adapted to cause transmission of the visual image of the individual at the selecting terminal to the selected terminal together with an indication of interest.

7. A system as claimed in claim 1, wherein the visual image is a still image.

8. A system as claimed in claim 1, wherein each terminal comprises means to activate the terminal and connect it to the networking means for a limited period of time upon payment of a time-related fee.

9. A system as claimed in claim 1, wherein there is a single store in which all said images of individuals at terminals are stored.

10. A system as claimed in claim 1, wherein there are a plurality of stores, each store communicating with at least one other store to exchange images of individual at terminals.

11. A system as claimed in claim 10, wherein each said image is initially stored at a predetermined respective one of said stores.

12. A system as claimed in claim 1, wherein the networking means utilizes a public ISDN.

13. A system as claimed in claim 12, wherein the networking means is controlled by the said selected terminal to permit direct communication via the ISDN between the selected and selecting terminal.

14. A system as claimed in claim 1, having a plurality of geographically or otherwise physically separate stations each comprising a plurality of said terminals, each terminal being screened and acoustically insulated from neighboring terminals.

15. A terminal for use in a system as claimed in claim 1, comprising means for recording a visual image of an individual using said terminal; means for transmitting said visual image to a store, means for receiving from said store a plurality of visual images originating from other terminals; means for selecting one of said received images; means for indicating said selection to a terminal which has transmitted the selected image; means for controlling communication with another terminal following receipt from said other terminal of an indication that the user thereof has viewed said recorded visual image and wishes to establish communication and means visually and acoustically screening the terminal from its surrounding.

16. The system of claim 1 wherein the store comprises at least one hard disc.

17. A method of facilitating introductions comprising providing a plurality of audio-visual terminals, recording a visual image of an individual at a said terminal and storing said image in a store together with corresponding images of unintroduced individuals at other said terminals, networking images from said store amongst terminals from which the images do not originate, selecting at said terminal an image from amongst those transmitted to that terminal, indicating such selection to the terminal from which the selected image originated by sending thereto the image of the individual at the selecting terminal, and initiating under the control of the individual at the selected terminal live audio visual communication between the individuals at the selecting and selected terminals.

18. A method as claimed in claim 17 comprising adding the image from the first-mentioned terminal to the store when said store already contains images from other said terminals and whilst said images are being networked.

19. A method as claimed in claim 17 wherein a terminal is supplied with networked images from the store only after the image from that terminal has been added to the store.

20. A method as claimed in claim 17, wherein said selection is indicated by the individual at the selecting terminal after he/she has viewed a video recording of the individual at the selected terminal.

21. A communication system for facilitating introductions comprising a plurality of terminals, each with a video camera directed to view an individual using said terminal, recording means for recording a visual image of said individual, means for adding said image to a store containing corresponding images from other said terminals, networking means for networking images form said store amongst terminals from which the images do not originate, selecting means enabling said individual to select an image from amongst those transmitted to his/her terminal, indicating means to indicate such selection to the terminal from which the selected image originated, communication means controlled by the individual at the selected terminal enabling the individuals at the selecting and selected terminals to communicate with each other, and means for the individual at the selecting terminal to review a video recording of an individual at a selected terminal before operating the indicating means.

22. A system as claimed in claim 21, wherein there are means preventing the individual at a selecting terminal from receiving said video recording of an individual at a selected terminal unless the visual image of the individual at the selecting terminal has first been added to the store.

23. A system claimed in claim 21, wherein each terminal comprises means for displaying simultaneously a plurality of the visual images transmitted thereto.

24. A system as claimed in claim 21, comprising means for the individual at the selecting terminal to record said video recording of him/herself at said terminal, and to transmit said recording to the store.

25. A system as claimed in claim 21, wherein the visual image is a still image.

26. A system as claimed in claim 21, wherein there is a singe store in which all said images of individuals at terminals are stored.

27. A system as claimed in claim 21, wherein there are a plurality of stores, each store communicating with at least one other store to exchange images of individuals at terminals.

28. A system as claimed in claim 27, wherein each said image is initially stored at a predetermined respective one of said stores.

29. A system as claimed in claim 21, wherein the networking means utilizes a public ISDN.

30. A system as claimed in claim 29, wherein the networking means is controlled by the said selected terminal to permit direct communication via the ISDN between the selected and selecting terminals.

31. A terminal for use in a system as claimed in claim 21, comprising means for recording a visual image of an individual using said terminal; means for transmitting said visual image to a store, means for receiving from said store a plurality of visual images originating from other terminals; means for selecting one of said received images; means for indicating said selection to a terminal which has transmitted the selected image; means for controlling communication with another terminal following receipt from said other terminal of an indication that the user thereof has viewed said recorded visual image and wishes to establish communication; and means visually and acoustically screening the terminal form its surroundings.

32. The system of claim 21, wherein the store comprises at least one hard disc.

33. A communication system for facilitating introductions comprising a plurality of terminals, each with a video camera directed to view an individual using said terminal; recording means for recording a visual image of said individual; means for adding said image to a store containing corresponding images from other said terminals; networking means for networking images from said store amongst terminals from which images do not originate, selecting means enabling said individual to select an image from amongst those transmitted to his/her terminal; indicating means to indicate such selection to the terminal from which the selected image originated; and communication means controlled by the individual at the selected terminals to communicate with each other, wherein the indicating means is adapted to cause transmission of the visual image of the individual at the selecting terminal to the selected terminal to indicate interest.

34. A communicated system for facilitating introduction comprising a plurality of terminals, each with a video camera directed to view an individual using said terminal; recording means for recording a visual image of said individual; means for adding said image to a store containing corresponding images form other said terminals; networking means for networking images from said store amongst terminals from which the images do not originate; selecting means enabling said individual to select an image from amongst those transmitted to his/her terminal; indicating means to indicate such selection to the terminal from which the selected image originated; and communication means controlled by the individual at the selected terminal enabling the individuals at the selecting and selected terminals to communicate with each others wherein each terminal comprises means to connect the terminal to the networking means upon payment of a fee.

35. A system as claimed in claim 4, comprising means controlling the store whereby the visual image from the activated terminal is stored during the use of the terminal by said individual and thereafter is erased or transferred to a secondary storage means.

36. A communication system for formulating introductions comprising a plurality of geographically or otherwise physically separate stations each comprising at least one terminal, each terminal being visually screened and acoustically insulated from its surroundings and having a video camera directed to view an individual using said terminal; recording means for recording a visual image of said individual; means for adding said image to a store containing corresponding images from other said terminals; networking means for networking images from said store amongst terminals from which the images do not originate; selecting means enabling said individual to select an image from amongst those transmitted to his/her terminal; indicating means to indicate such selection to the terminal from which the selected image originated; and communication means controlled by the individual at the selected terminal enabling the individuals at the selecting and selected terminals to communicate with each other.

37. A system as claimed in claim 6, wherein the networking means is adapted to network the visual image originating from said selecting terminal to other terminals in a defined geographical area.

38. A system as claimed in claim 36, wherein each station has a plurality of terminals, each visually screened and acoustically insulated from its neighboring terminals.

* * * * *

UNITED STATES PATENT AND TRADEMARK OFFICE
CERTIFICATE OF CORRECTION

PATENT NO.    : 5,598,351
DATED         : January 28, 1997
INVENTOR(S)   : John C. Chater, Ian Chater, Guy Chater It is certified that error appears in the above-identified patent and that said Letters Patent is hereby corrected as shown below:

Column 8,
Line 14, "said" (first occurrence) should be deleted.
Line 37, before "still" insert --a --

Column 10,
Line 53, "terminals" should be -- terminal -- and "to" should be deleted.
Line 54, before "communicate" insert -- enabling the individuals at the selecting and selected terminals to --.
Line 58, "communicated" should be -- communication --.

Column 11,
Line 5, "others" should be -- other, --.

Signed and Sealed this

Second Day of April, 2002

*Attest:*

JAMES E. ROGAN
*Attesting Officer*    *Director of the United States Patent and Trademark Office*

UNITED STATES PATENT AND TRADEMARK OFFICE
CERTIFICATE OF CORRECTION

PATENT NO.    : 5,598,351
DATED         : January 28, 1997
INVENTOR(S)   : John C. Chater, Ian Chater and Guy Chater It is certified that error appears in the above-identified patent and that said Letters Patent is hereby corrected as shown below:

<u>Column 11,</u>
Line 8, "4" should be -- 34 --.

Signed and Sealed this

Twenty-fourth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.    : 5,598,351                                           Page 1 of 1
DATED         : January 28, 1997
INVENTOR(S)   : John C. Chater, Ian Chater and Guy Chater It is certified that error appears in the above-identified patent and that said Letters Patent is hereby corrected as shown below:

Column 10,
Line 5, "selecting" should be -- selected --

Signed and Sealed this

Twenty-seventh Day of January, 2004

JON W. DUDAS
*Acting Director of the United States Patent and Trademark Office*